(12) United States Patent
Franzen et al.

(10) Patent No.: US 9,522,623 B2
(45) Date of Patent: Dec. 20, 2016

(54) HEAVY DUTY TRANSPORT VEHICLE FOR ISO CONTAINERS

(75) Inventors: Hermann Franzen, Mönchengladbach (DE); Armin Wieschemann, Oberhausen (DE); Jannis Moutsokapas, Monheim (DE)

(73) Assignee: Terex MHPS GmbH, Düsseldorf (DE)

( * ) Notice: Subject to any disclaimer, the term of this patent is extended or adjusted under 35 U.S.C. 154(b) by 164 days.

(21) Appl. No.: 13/884,186

(22) PCT Filed: Nov. 9, 2011

(86) PCT No.: PCT/EP2011/069752
§ 371 (c)(1),
(2), (4) Date: May 8, 2013

(87) PCT Pub. No.: WO2012/062808
PCT Pub. Date: May 18, 2012

(65) Prior Publication Data
US 2013/0240280 A1    Sep. 19, 2013

(30) Foreign Application Priority Data
Nov. 11, 2010  (DE) .................. 10 2010 060 505

(51) Int. Cl.
*B62D 33/00* (2006.01)
*B62D 33/02* (2006.01)
(Continued)

(52) U.S. Cl.
CPC ............ *B60P 1/6418* (2013.01); *B62D 33/00* (2013.01); *B62D 33/02* (2013.01); *B62D 33/06* (2013.01)

(58) Field of Classification Search
CPC ......... B62D 1/28; B62D 33/063; B62D 33/00; B62D 33/02; B62D 33/06; B60P 3/00; B60T 7/22
See application file for complete search history.

(56) References Cited

U.S. PATENT DOCUMENTS

| 3,474,877 A | 10/1969 | Wesener |
| 3,669,206 A | 6/1972 | Tax et al. |

(Continued)

FOREIGN PATENT DOCUMENTS

| CN | 201619572 U | 11/2010 |
| CN | 201619620 U | 11/2010 |

(Continued)

OTHER PUBLICATIONS

Machine translation of WO2009019330 provided by http://translationportal.epo.org at epo.org website retrieved Oct. 30, 2015.*

(Continued)

*Primary Examiner* — Joseph Rocca
*Assistant Examiner* — Travis Coolman
(74) *Attorney, Agent, or Firm* — Gardner, Linn, Burkhart & Flory, LLP

(57) ABSTRACT

A floor-bound heavy duty transport vehicle for transporting ISO containers, which, in an initial state, can be operated exclusively in a non-automated operating mode by an operator and can be freely displaced by means of wheels having pneumatic rubber tires. The vehicle comprises a driver's cab having a non-automated control system for non-automated steering, non-automated motion control and non-automated braking, which vehicle can optionally also be used in an automated mode. For this purpose, the heavy duty transport vehicle can be converted such that it can also be operated in an automated mode without a driver and has at least one second installation space for antennae for the conversion.

16 Claims, 2 Drawing Sheets

(51) Int. Cl.
  *B62D 33/06* (2006.01)
  *B60P 1/64* (2006.01)

(56) References Cited

U.S. PATENT DOCUMENTS

| | | | | |
|---|---|---|---|---|
| 4,015,680 | A * | 4/1977 | Pircher et al. | 180/168 |
| 4,162,869 | A | 7/1979 | Hitomi et al. | |
| 4,215,759 | A | 8/1980 | Diaz | |
| 4,361,202 | A | 11/1982 | Minovitch | |
| 4,465,155 | A * | 8/1984 | Collins | 180/169 |
| 5,127,486 | A * | 7/1992 | Yardley et al. | 180/168 |
| 5,156,230 | A * | 10/1992 | Washburn | 180/170 |
| 5,816,352 | A * | 10/1998 | Hacker | A63G 25/00 180/167 |
| 5,974,347 | A * | 10/1999 | Nelson | 701/22 |
| 6,129,026 | A | 10/2000 | LeCroy | |
| 6,467,992 | B1 * | 10/2002 | Dietrich | 404/101 |
| 6,619,177 | B1 * | 9/2003 | Hansen et al. | 89/1.13 |
| 6,915,871 | B2 * | 7/2005 | Gavish | A63G 25/00 180/167 |
| 6,923,281 | B2 * | 8/2005 | Chernoff et al. | 180/65.245 |
| 7,344,430 | B2 * | 3/2008 | Hasty | A63H 17/395 180/167 |
| 7,438,148 | B1 * | 10/2008 | Crea | B62D 1/00 180/167 |
| 7,441,615 | B2 * | 10/2008 | Borroni-Bird et al. | 180/58 |
| 7,894,951 | B2 * | 2/2011 | Norris et al. | 701/36 |
| 8,108,090 | B2 | 1/2012 | Bauer | |
| 8,128,064 | B2 | 3/2012 | Franzen et al. | |
| 8,649,930 | B2 * | 2/2014 | Reeve et al. | 701/24 |
| 2005/0131645 | A1 * | 6/2005 | Panopoulos | 701/214 |
| 2006/0284448 | A1 * | 12/2006 | Heilmann et al. | 296/190.04 |
| 2008/0125938 | A1 * | 5/2008 | Pierpont | 701/41 |
| 2011/0071718 | A1 * | 3/2011 | Norris et al. | 701/23 |
| 2011/0224873 | A1 * | 9/2011 | Reeve et al. | 701/41 |

FOREIGN PATENT DOCUMENTS

| | | |
|---|---|---|
| DE | 1153641 | 8/1963 |
| DE | 8103755 | 2/1981 |
| DE | 19613386 A1 | 10/1997 |
| DE | 10116927 A1 | 10/2002 |
| DE | 202007016156 A1 | 3/2007 |
| DE | 102007030098 A1 | 1/2008 |
| DE | 102007039778 A1 | 2/2009 |
| DE | 202010001496 U1 | 6/2010 |
| EP | 0302569 A1 | 8/1988 |
| EP | 2119663 A2 | 11/2009 |
| EP | 2060472 B1 | 4/2011 |
| WO | 2009019330 A1 | 2/2009 |
| WO | 2011023868 A1 | 3/2011 |
| WO | 2012062807 A1 | 5/2012 |

OTHER PUBLICATIONS

English translation of International Preliminary Report on Patentability from corresponding International Application PCT/EP2011/069752.

English translation of WO 2012/062807 corresponding to commonly owned, co-pending U.S. Appl. No. 13/884,855, filed May 10, 2013.

International Search Report completed Jan. 5, 2012, from corresponding International Application No. PCT/EP2011/069752.

Written Opinion of the International Searching Authority for International Application No. PCT/EP2011/069752.

International Preliminary Examination Report for International Application No. PCT/EP2011/069752.

* cited by examiner

HEAVY DUTY TRANSPORT VEHICLE FOR ISO CONTAINERS

CROSS REFERENCE TO RELATED APPLICATIONS

The present application claims the priority benefits of International Patent Application No. PCT/EP2011/069752, filed on Nov. 9, 2011, and also of German Patent Application No. DE 10 2010 060 505.0, filed on Nov. 11, 2010, which are hereby incorporated herein by reference in their entireties.

BACKGROUND OF THE INVENTION

The invention relates to a heavy-duty transport vehicle for transporting ISO containers which, in an initial state, can be operated exclusively in a manual operating mode by an operator, is displaceable in a floor-bound and free manner by means of wheels having pneumatic rubber tyres, having a driver's cab which is provided with a manual control system for manual steering, manual movement control and manual braking.

Systems for handling, i.e., loading and unloading of vehicles, ships and trains and the storage of containers, in particular ISO containers, are known.

For the purposes of ISO container handling, known systems use on the one hand heavy-duty transport vehicles which are manually operated by an operator or a vehicle driver and on the other hand automatically operated heavy-duty transport vehicles which form a sub-group of automated guided vehicles (AGV) specifically designed to handle large loads.

In terms of the invention, a heavy-duty transport vehicle is understood to be a floor-bound vehicle which is freely displaceable by means of wheels having pneumatic rubber tyres and in this case can transport a payload of at least 15 t, preferably at least 20 t. ISO containers and swap containers are considered as loads for such heavy-duty transport vehicles. Loaded swap containers can generally weigh up to about 16 t. ISO containers in their own right weigh up to 45 t in the loaded state. The transportation of ISO containers is preferred. ISO containers are understood generally to be standardised large containers having standardised pick-up points or corners for load picking-up means. A heavy-duty transport vehicle which is empty when travelling or transports an empty ISO container or swap container should also come into this category if this vehicle can transport a payload of at least 15 t, preferably at least 20 t. It can also be the case that such heavy-duty transport vehicles operate in a mixed operation, i.e., transport not only ISO containers or swap containers but also other loads such as semi-trailers, swap trailers, trailers, heavy goods vehicles or motor tractors.

In the case of the manually operated heavy-duty transport vehicles, such as e.g. articulated lorries or similar conventional heavy goods vehicles, the vehicle is operated and controlled by a vehicle driver from a vehicle driver's position or a driver's cab in a typical manner. This is a mode of operation which is suitable in particular for smaller plants and for public highway traffic.

A corresponding conventional heavy goods vehicle which can be operated exclusively in a manual operating mode by an operator, is freely displaceable in a floor-bound manner by means of wheels and has a driver's cab which can be releasably attached to various points of the heavy goods vehicle is known e.g. from DE 1 153 641 B.

The so-called driverless heavy-duty transport vehicles in the sense of an AGV include a dedicated traction drive and are operated automatically, i.e., without a vehicle driver or operator and for this purpose are controlled automatically from a control centre or a central computer with the aid of predetermined, programmed procedures.

A driverless automated operation or automated mode in this sense does not include a remote-controlled operation, in which although there is no operator intervening directly at a vehicle driver's position or in a driver's cab, there is an operator intervening indirectly via a corresponding remote control and thus still in a manual manner to operate and control the heavy-duty transport vehicle.

However, in terms of the present invention "driverless" is to be understood to be "unmanned" or "fully automatic". This does not include faults and emergency interventions. The regular control of a corresponding heavy-duty transport vehicle is effected during normal operation in an automated mode and in this case via automatic means, i.e., programmable devices for automatic position detection and for the generation, transmission and evaluation of the required control signals.

Such driverless heavy-duty transport vehicles are defined e.g. in the VDI (Association of German Engineers) guideline 2510. These vehicles are particularly suitable for larger plants, in which the outlay for the infrastructure additionally required for automation is at least compensated for.

EP 0 302 569 B1 also discloses a heavy-duty transport vehicle for ISO containers which is freely displaceable in a floor-bound manner by means of wheels having pneumatic rubber tyres, and is provided exclusively for a fully automatic and driverless operation. For the purpose of fully automatic control, the heavy-duty transport vehicle includes a navigation system which is disposed in an installation space on the underside of the heavy-duty transport vehicle and is assisted by an additional positioning system. A transceiver unit of the positioning system is disposed on the underside of the installation space.

Corresponding vehicles are also known from DE 10 2007 039 778 A1 which describes a floor-bound transport vehicle (AGV) for the transportation of ISO containers having at least one lifting platform which is disposed on a vehicle frame of the transport vehicle and can be raised from a lowered transport position via a lifting drive to a raised transfer position or lowered in converse fashion. The lifting platform is attached to the vehicle frame via at least one knee lever, the lifting platform can be raised or lowered via the at least one knee lever, the lifting drive acts upon the at least one knee lever and the lifting platform for the lifting and lowering movement is guided on the transport vehicle.

DE 81 03 755 U1 discloses a conventional forklift truck for pallets and small to medium containers which can be operated predominantly without a driver but also manually. For the manual operation which is used merely in exceptional cases, e.g. in an emergency operation, a driver's cab having control devices is provided for an operator. During driverless operation, the driver's cab is positioned and attached in a holding space on the forklift truck and is simultaneously moved in a permanent manner by the moving forklift truck. Only during manual operation is the driver's cab releasably attached to the forks of the forklift truck, in order then to be driven vertically up and down with the forks via a lifting structure.

International patent application WO 2009/019330 A1 discloses a vehicle for transporting ISO containers which has a modular construction. The vehicle can be operated optionally as a conventional, motorised heavy-duty transport vehicle or as a mere trailer. For operation as a motorised heavy-duty transport vehicle, the vehicle is controlled by an operator, for whom a driver's cab can be mounted on the vehicle. Automated operation is not provided for the vehicle.

International patent application WO 2011/023868 A1 also discloses a vehicle, which has a modular construction, for transporting ISO containers. In this case, the vehicle can be equipped in its initial operating state with an automatic control system or with a driver's cab.

US patent application US 2005/131645 A1 relates to an automatically operated transport system, inter alia for freight and containers which additionally comprises optional control devices for steering, accelerating or braking by a driver. The initial operating state of the transport system is designed from the outset for automated operation.

SUMMARY OF THE INVENTION

The heavy-duty transport vehicle of the present invention provides a manually operated heavy-duty transport vehicle for ISO containers which can optionally also be used in an automated operation.

By virtue of the fact that the heavy-duty transport vehicle can be operated in an automated mode without a driver by means of a conversion, for the automated mode has at least one second installation space for antennas, the second installation space for antennas is disposed in the front or rear region below a vehicle frame between a front axle and the front end side of the heavy-duty transport vehicle or between a rear axle and a rear end side of the heavy-duty transport vehicle, for the automated mode antennas are disposed in the second installation space, the heavy-duty transport vehicle is equipped with a vehicle control which is in operative connection with the traction drive and/or steering and/or braking system, the heavy-duty transport vehicle has an interface for coupling the manual control system and the antennas to the vehicle control, the vehicle control has an automatic means, which can be activated for driverless automated operation, for inputting and storing possible travel routes and a transport assignment, for automatically determining the vehicle position in space, for controlling the movement of the vehicle in dependence upon its position in space and upon the specified transport assignment and for braking the vehicle when obstacles are present and the driver's cab is releasably attached to the heavy-duty transport vehicle, in particular to a front end side of the heavy-duty transport vehicle, it is possible in a simple manner to convert the container transport vehicle at a later stage for automated operation. Operators of smaller plants can thus initially start with manual vehicles and then convert these vehicles for automated operation at a later stage, e.g. owing to growth. During manual operation, the vehicle driver controls the container transport vehicle from the driver's cab by means of the manual control system for manual steering, manual movement control and manual braking. The driver's cab can be detached for use in automated operation.

It is also particularly advantageous that the manual control system can be activated or deactivated via a safety circuit.

In a further advantageous embodiment, it is provided in this case that the automatic means is configured in order, after activation of the automated mode, to intervene into the control of the heavy-duty transport vehicle and to assume this control during driverless automated operation.

In other words, the heavy-duty transport vehicle includes a vehicle control which is able to ensure automatic operation but which, during manual operation, is deactivated or "overruled" by the manual control system (in the driver's cab). This embodiment significantly facilitates subsequent upgrading or converting.

In the case where more than only one second installation space for antennas is provided, it is advantageous corresponding to the arrangement of the one second installation space for antennas that an additional second installation space for antennas is disposed in the rear or front region below the vehicle frame between the rear axle and the rear end side of the heavy-duty transport vehicle or between the front axle and the front end side of the heavy-duty transport vehicle. Therefore, at least one second installation space for antennas is consequently provided in each case in the front region as well as in the rear region.

Further details, features and advantages of the invention will be apparent from the description hereinafter of an exemplified embodiment with reference to the single drawing.

DESCRIPTION OF THE PREFERRED EMBODIMENTS

Figure 1:
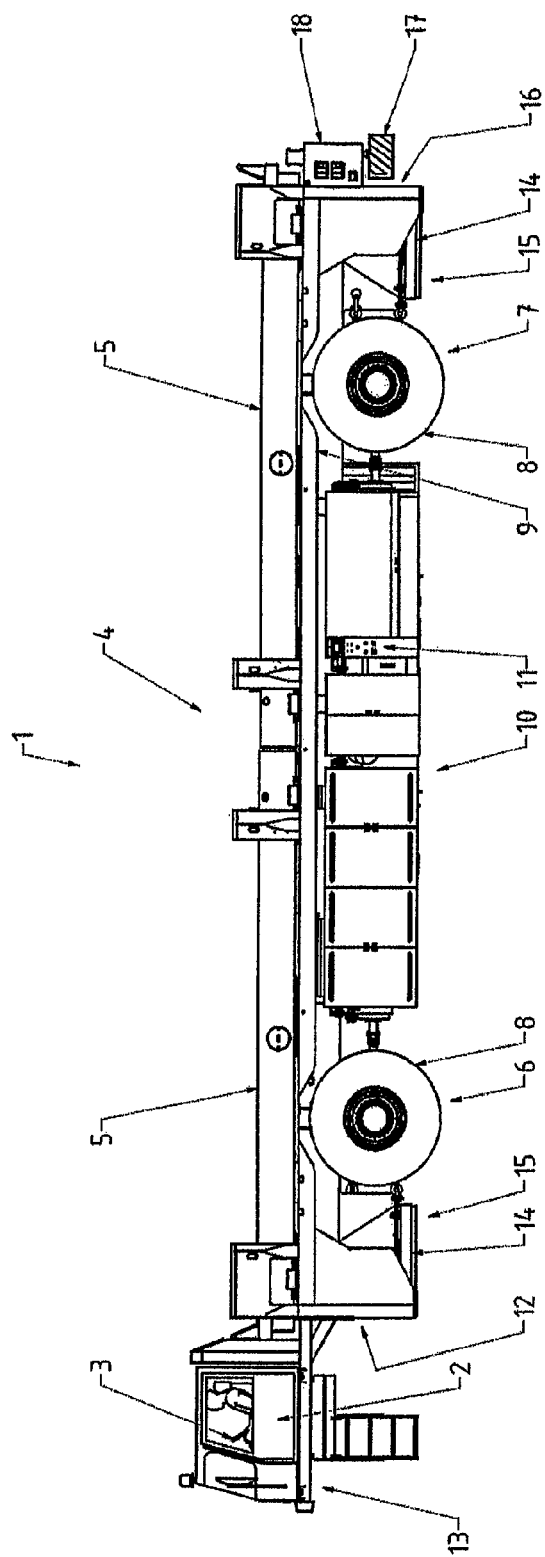
FIG. 1 is a schematic side view of a heavy-duty transport vehicle which can originally be operated exclusively in a manual operating mode, but on the basis of the manual operation can be converted for a driverless, fully automatic operation.
Figure 2:
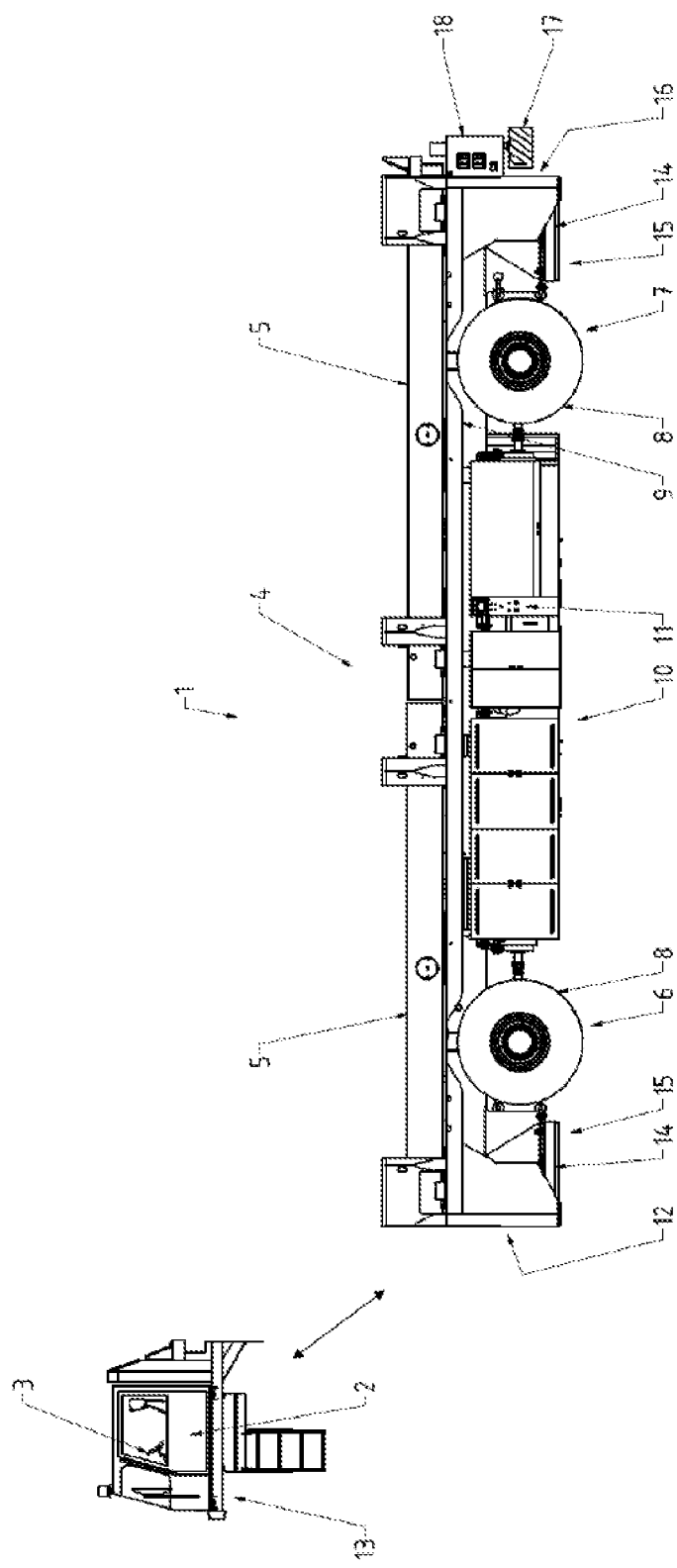
FIG. 2 is a schematic side view of the heavy-duty transport vehicle of FIG. 1 shown with the driver's cab released from the vehicle.

The Figure shows a corresponding heavy-duty transport vehicle 1 having a driver's cab 2 which is floor-bound and is freely displaceable by means of wheels 8 having pneumatic rubber tyres. In an initial state, the heavy-duty transport vehicle 1 can be operated exclusively in a manual manner. For the manual operation of the heavy-duty transport vehicle 1, the driver's cab 2 is provided with a manual control system 3 for manual steering, manual movement control and manual braking. A driverless, fully automatic operation of the heavy-duty transport vehicle 1 is not possible in the initial state.

The driver's cab 2 is releasably attached to the front end side 12 of the heavy-duty transport vehicle 1. To this end, the driver's cab 2 is disposed on an elevated support platform 13 which is releasably bolted at the front end side 12 of the heavy-duty transport vehicle 1. The support platform 13 is elevated to the extent that the driver in the driver's cable 2 has a good overview. It is located at about the same level as the upper side of the vehicle frame 9.

The heavy-duty transport vehicle 1 also includes a loading surface 4 having two lifting platforms 5 which can be raised and lowered in each case independently of each other and by means of which up to two ISO containers can be picked up.

Furthermore, the heavy-duty transport vehicle 1 has a front axle 6 and rear axle 7 which are each electrically driven and whose wheels 8 can each be steered hydraulically. Therefore, the heavy-duty transport vehicle 1 is able to perform not only the normal "straight ahead" and "cornering" steering modes but also the so-called backward movement and all-wheel steering, in which all of the wheels are steered.

Provided between the axles 6 and 7 below the vehicle frame 9 is a first installation space 10, in which not only a drive unit, a transmission and a diesel tank but also a vehicle control 11 are disposed.

It is understood that the configuration of the drive unit is not important within the scope of the invention. So-called zero-emissions drive units, such as e.g. batteries, can also be used. Mixed, hybrid operating modes are also feasible.

The parts of the drive train are disposed in the transverse direction of the vehicle approximately along the longitudinal centre axis of the heavy-duty transport vehicle 1 and the components of the vehicle control 11 are disposed laterally next to them so as to be accessible from the outside behind flaps in a rack-like installation frame.

The vehicle control 11 is in operative connection with the traction drive, the hydraulic steering and the braking system and the manual control system 3.

In the initial state of the heavy-duty transport vehicle 1, the manual control system 3 is connected via an interface to the vehicle control 11. This can be a plug-in connection for the corresponding cables which, in use, activates the manual control system 3 for the vehicle control. An additional safety circuit for activating or deactivating the manual control system 3 can also be provided in the driver's cab 2.

In order to convert the heavy-duty transport vehicle 1 starting from the initial state such that a driverless, fully automatic operation is also possible, the heavy-duty transport vehicle 1 is equipped with antennas 14 which are connected via a corresponding interface to the vehicle control 11. As a result, corresponding control signals can be exchanged, in a wireless manner via radio communication, e.g. GPS, or other suitable electromagnetic waves, between a central, typically computer-assisted control room, not illustrated, and the antennas 14 which are connected to the vehicle control 11. In this case, the exchange of control signals is understood to be the transmission and/or reception of the corresponding control signals. Therefore, the control signals no longer have to be generated by the direct action of an operator via the manual control system 3, instead various operating scenarios or sequences run automatically. In other words, after conversion for a driverless, fully automatic operation, the functions of the manual control system 3 are assumed by the central control room and the antennas 14 connected to the vehicle control 11.

The vehicle control 11 thus likewise includes an automatic means for an automated operation or for a driverless operation of the heavy-duty transport vehicle 1 in the sense of an AGV, e.g. a navigation system connected to the antennas 14, in particular a navigation computer system. The automatic means is connected via the corresponding interface to the antennas 14. During manual operation, the automatic means is deactivated, during automatic operation it is overridden by the manual control system 3. The latter is the case in particular, if e.g. during ongoing driverless automated operation, manual intervention by an operator necessitates an emergency stop of the heavy-duty transport vehicle 1 on account of a fault.

In a corresponding manner, it is also possible to activate the vehicle control 11 or the means for an automated operation, in order to change from the manual operation of the heavy-duty transport vehicle 1 to the driverless, fully automatic operation.

If the manual control system 3 is deactivated or removed, the heavy-duty transport vehicle 1 is controlled and operated by the then activated automatic means of the vehicle control 11. The automatic means can be activated via a corresponding circuit in the driver's cab 2 or by the removal thereof.

The automatic means of the vehicle control 11 includes e.g. means for inputting and storing possible travel routes and a transport assignment, for automatically determining the vehicle position in space, for controlling the movement of the heavy-duty transport vehicle 1 in dependence upon the position thereof in space and upon the specified transport assignment, and for braking the heavy-duty transport vehicle 1 when obstacles are present, as known within the domain of driverless AGVs. In this manner, the heavy-duty transport vehicle 1 can exchange, evaluate and be controlled by corresponding data via the antennas 14 and the vehicle control 11, which includes the automatic means or the navigation system, from the central control room.

In order to ensure that, during driverless automated operation, the heavy-duty transport vehicle 1 or vehicle control 11 thereof can receive and evaluate corresponding data or control signals from the control room, or transmit them to the control room, it requires the antennas 14 which are connected to the vehicle control 11.

They can be installed in a second installation space 15 during conversion to automated operation. The second installation space 15 for the antennas 14 is located in the front or rear region below the vehicle frame 9 between the front axle 6 and the front end side 12 of the heavy-duty transport vehicle 1 or between the rear axle 7 and the rear end side 16 of the heavy-duty transport vehicle 1. It is also possible to have two second installation spaces 15 which are disposed correspondingly in the front and rear region.

Moreover, a mountable buffer region 18 can be added at the rear end side 16 of the heavy-duty transport vehicle 1. The mountable buffer region 18 can additionally also be used to receive a buffer cross member 17 which serves as a protective device and emergency shut-off device during automated operation. During automated operation, the activation of the buffer cross members 17 effects an emergency braking procedure in the event of unwanted contact with obstacles, which results in the cessation of all travel movements.

LIST OF REFERENCE NUMERALS 1 heavy-duty transport vehicle
2 driver's cab
3 manual control system
4 loading surface
5 lifting platform
6 front axle
7 rear axle
8 wheels
9 vehicle frame
10 first installation space
11 vehicle control
12 front end side
13 support platform
14 antennas
15 second installation space
16 rear end side
17 buffer cross member
18 mountable buffer region

The invention claimed is:

1. Heavy-duty transport vehicle for transporting ISO containers, said vehicle comprising:
   a front axle, a rear axle, and a vehicle frame;
   a front region defined below the vehicle frame and between the front axle and a front end side of the heavy-duty transport vehicle;
   a rear region defined below the vehicle frame and between the rear axle and a rear end side of the heavy-duty transport vehicle;
   an installation space disposed in the front region or the rear region;

antennas configured to be disposed in the installation space for conversion of the heavy-duty transport vehicle from a manual mode to an automated mode;

pneumatic rubber tyres mounted at the front and rear axles, the tyres permitting displacement of the heavy-duty transport vehicle in a floor-bound and free manner;

a traction drive system operable to drive at least one of the tyres, a steering system, and a braking system;

a driver's cab releasably attached to the heavy-duty transport vehicle, the driver's cab having a manual control system operable to provide manual steering via the steering system, manual movement control via the traction drive system, and manual braking via the braking system;

a safety circuit provided in the driver's cab, wherein the safety circuit is operable to activate and deactivate the manual control system;

a vehicle control in operative connection with the traction drive system and/or the steering system and/or the braking system, wherein when the driver's cab and the manual control system are installed and when the antennas are installed in the installation space, the vehicle control is operable to change from the manual mode to the automated mode;

wherein the vehicle control has an automatic navigation system that is activatable for:
automated operation without an operator, for
inputting and storing possible travel routes and a transport assignment;
automatically determining the vehicle position in space;
controlling the movement of the vehicle in dependence upon its position in space and upon the specified transport assignment; and
braking the heavy-duty transport vehicle when obstacles are present and the driver's cab is releasably attached to the heavy-duty transport vehicle;

an interface for coupling the vehicle control to (i) the manual control system of the driver's cab and (ii) the antennas when the antennas are installed in the installation space;

wherein the heavy-duty transport vehicle is operable in an initial state in which (i) the heavy-duty transport vehicle is configured to be operated exclusively and only in a manual operating mode by an operator, (ii) the antennas are not present in the installation space, and (iii) the heavy-duty transport vehicle cannot be operated without an operator actively manipulating the manual control system from the driver's cab;

wherein the heavy-duty transport vehicle is operable in the automated mode without an operator by means of a conversion including at least installation of the antennas in the installation space; and wherein the vehicle control operates to activate the automated mode upon removal of the driver's cab or upon deactivation of the manual control system.

2. Heavy-duty transport vehicle as claimed in claim 1, wherein the driver's cab is releasably attached to a front end side of the heavy-duty transport vehicle.

3. Heavy-duty transport vehicle as claimed in claim 2, wherein the automatic navigation system is configured, in order, after activation of the automated mode, to intervene into the control of the heavy-duty transport vehicle and to assume this control during automated operation.

4. Heavy-duty transport vehicle as claimed in claim 3, wherein an additional installation space for antennas is disposed in the rear or front region.

5. Heavy-duty transport vehicle as claimed in claim 2, wherein an additional installation space for antennas is disposed in the rear or front region.

6. Heavy-duty transport vehicle as claimed in claim 1, wherein the automatic navigation system is configured, in order, after activation of the automated mode, to intervene into the control of the heavy-duty transport vehicle and to assume this control during automated operation.

7. Heavy-duty transport vehicle as claimed in claim 6, wherein an additional installation space for antennas is disposed in the rear or front region.

8. Heavy-duty transport vehicle as claimed in claim 1, wherein said heavy-duty transport vehicle includes a mountable buffer region or a mountable buffer region and a buffer cross member.

9. Heavy-duty transport vehicle as claimed in claim 8, wherein said mountable buffer region or said mountable buffer region and said buffer cross member are located at the rear end side of said heavy-duty transport vehicle.

10. Heavy-duty transport vehicle as claimed in claim 1, wherein an additional installation space for antennas is disposed in the rear or front region.

11. Heavy-duty transport vehicle for transporting ISO containers, said vehicle comprising: a front axle, a rear axle, and a vehicle frame;

a front region defined below the vehicle frame and between the front axle and a front end side of the heavy-duty transport vehicle;

a rear region defined below the vehicle frame and between the rear axle and a rear end side of the heavy-duty transport vehicle;

an installation space disposed in the front region or the rear region;

antennas configured to be disposed in the installation space for conversion of the heavy-duty transport vehicle from a manual mode to an automated mode;

pneumatic rubber tyres mounted at the front and rear axles, the tyres permitting displacement of the heavy-duty transport vehicle in a floor-bound and free manner;

a traction drive system operable to drive at least one of the tyres, a steering system, and a braking system;

a driver's cab releasably attached to the heavy-duty transport vehicle, the driver's cab having a manual control system operable to provide manual steering via the steering system, manual movement control via the traction drive system, and manual braking via the braking system;

a safety circuit provided in the driver's cab, wherein the safety circuit is operable to activate and deactivate the manual control system;

a vehicle control in operative connection with the traction drive system and/or the steering system and/or the braking system, wherein when the driver's cab and the manual control system are installed and when the antennas are installed in the installation space, the vehicle control is operable to change from the manual mode to the automated mode;

wherein the vehicle control has a navigation computer system that is activatable for:
enabling automated operation without an operator;
inputting and storing possible travel routes and a transport assignment;

automatically determining the vehicle position in space;

controlling the movement of the vehicle in dependence upon its position in space and upon the specified transport assignment; and braking the heavy-duty transport vehicle when obstacles are present;

an interface for coupling the vehicle control to (i) the manual control system of the driver's cab and (ii) the antennas when the antennas are installed in the installation space;

wherein the heavy-duty transport vehicle is operable in an initial state in which (i) the heavy-duty transport vehicle is configured to be operated exclusively and only in a manual operating mode by an operator, (ii) the antennas are not present in the installation space, and (iii) the heavy-duty transport vehicle cannot be operated without an operator actively manipulating the manual control system from the driver's cab;

wherein the heavy-duty transport vehicle is operable in the automated mode without an operator by means of a conversion including at least installation of the antennas in the installation space; and wherein the vehicle control operates to activate the automated mode upon removal of the driver's cab or upon deactivation of the manual control system.

12. Heavy-duty transport vehicle as claimed in claim 11, wherein said heavy-duty transport vehicle includes a mountable buffer region or a mountable buffer region and a buffer cross member.

13. Heavy-duty transport vehicle as claimed in claim 12, wherein said mountable buffer region or said mountable buffer region and said buffer cross member are located at the rear end side of said heavy-duty transport vehicle.

14. Heavy-duty transport vehicle as claimed in claim 11, wherein the driver's cab is releasably attached to a front end side of the heavy-duty transport vehicle.

15. Heavy-duty transport vehicle as claimed in claim 11, wherein the vehicle control is configured, in order, after activation of the automated mode, to assume control during automated operation.

16. Heavy-duty transport vehicle as claimed in claim 11, wherein an additional installation space for antennas is disposed in the rear or front region.

* * * * *